United States Patent

Weinfurt

[15] 3,675,237
[45] July 4, 1972

[54] CODE TRANSMITTER HAVING INTERMITTENT DRIVE MECHANISM

[72] Inventor: William J. Weinfurt, Elm Grove, Wis.
[73] Assignee: McGraw-Edison Company, Elgin, Ill.
[22] Filed: March 2, 1970
[21] Appl. No.: 15,362

[52] U.S. Cl. .................................... 340/357 R, 340/151 R
[51] Int. Cl. ......................................................... H04g 9/10
[58] Field of Search ................................ 340/357, 150, 151

[56] References Cited

UNITED STATES PATENTS

| 1,621,939 | 3/1927 | Lowe | 340/357 |
| 3,253,260 | 5/1966 | Hawley | 340/151 |
| 3,492,649 | 1/1970 | Polillo | 340/151 |

*Primary Examiner*—Harold I. Pitts
*Attorney*—Richard C. Ruppin

[57] ABSTRACT

An intermittent drive mechanism for an encoding device is driven by a continuously rotating drive source. First and second Geneva drive discs are each rotated through a sequence of rotated rapid incremental displacements to a plurality of positions each of which are utilized for providing coded information. The first Geneva drive disc is rotated by a drive means which is moved to a high energy level condition by the drive source and permitted to rapidly discharge. A second drive means is connected to the first disc and is moved to a high energy level condition by rotation of the first disc and permitted to discharge to rapidly drive the second disc.

15 Claims, 6 Drawing Figures

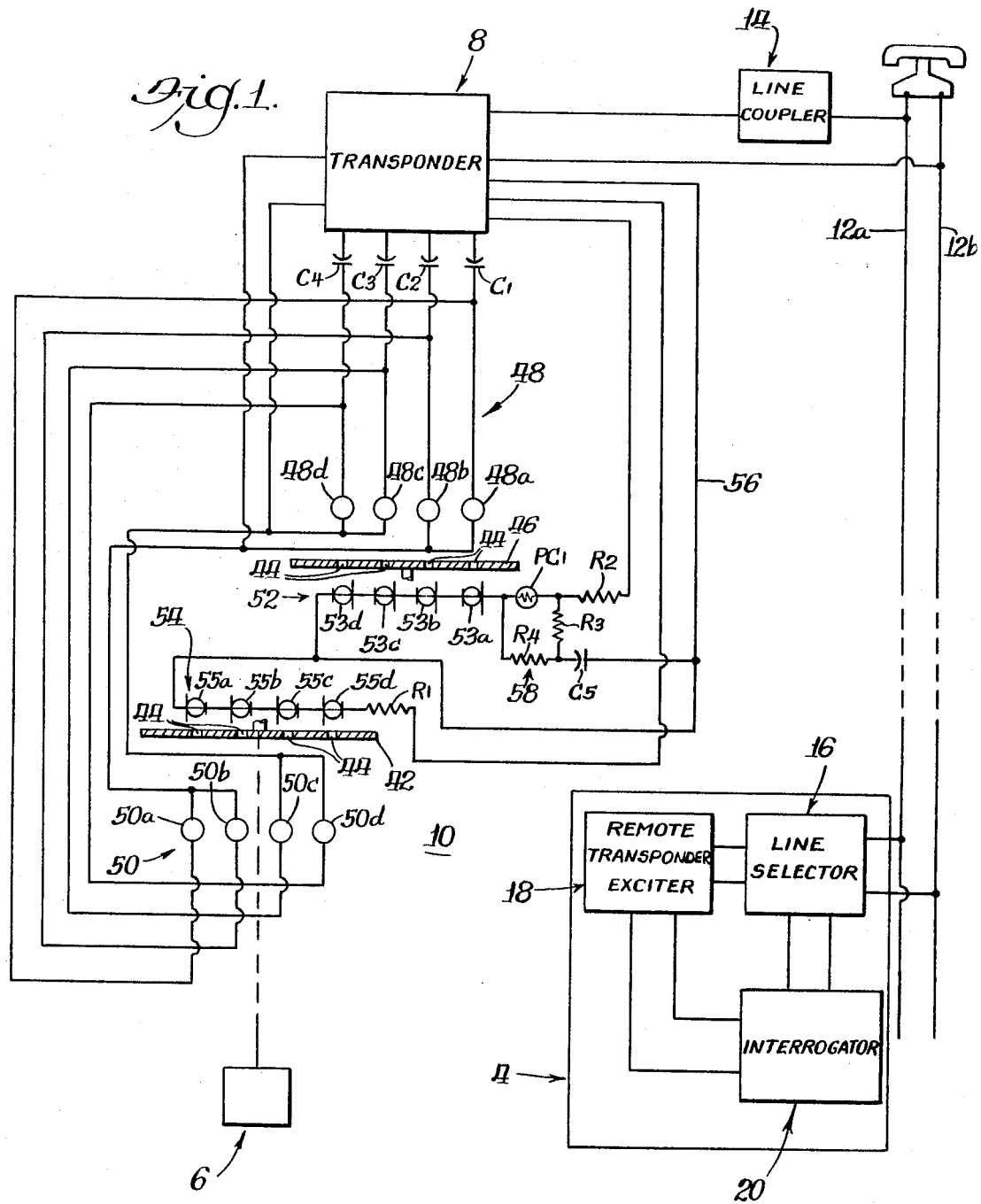

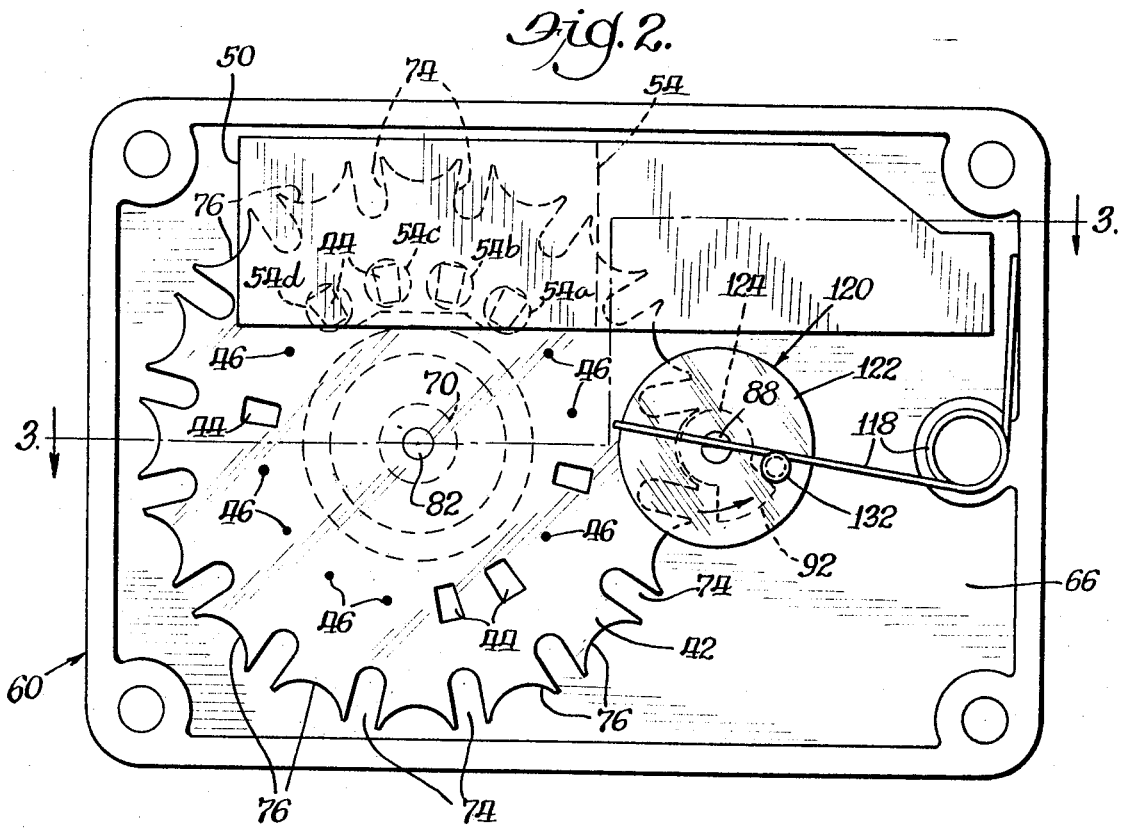
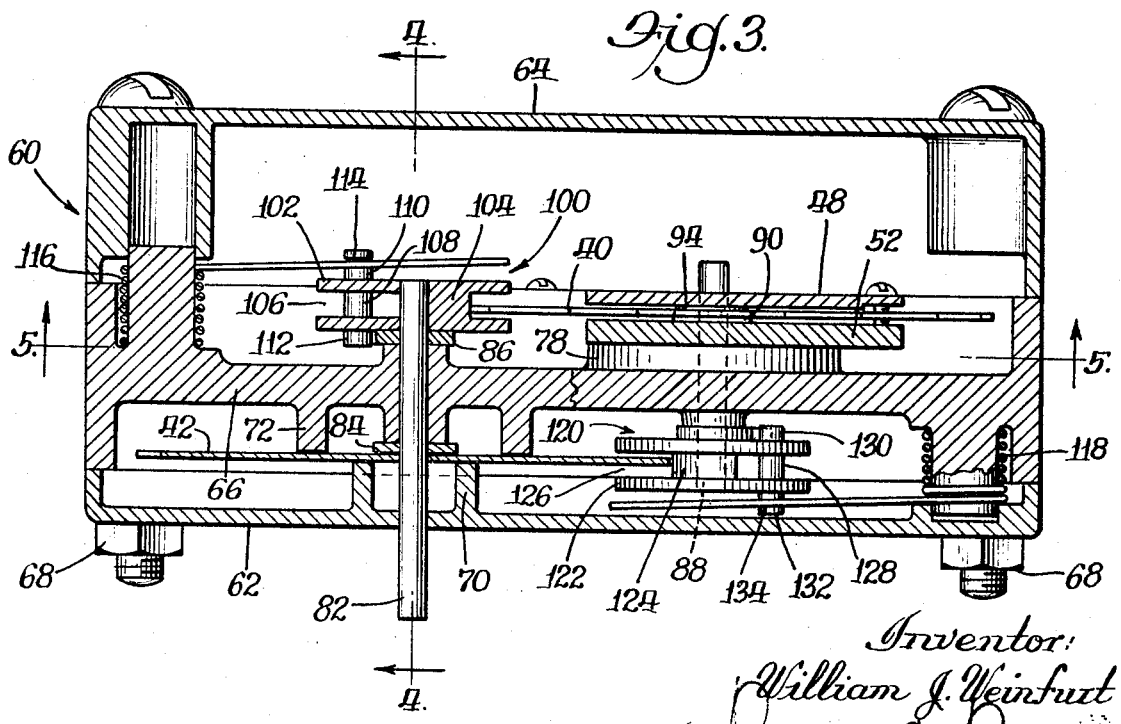

Inventor
William J. Weinfurt
By Richard C. Ruppin
Attorney 3,675,237

CODE TRANSMITTER HAVING INTERMITTENT DRIVE MECHANISM

BACKGROUND OF THE INVENTION

This invention relates to an intermittent drive mechanism and, more particularly, to a drive mechanism for providing a sequence of intermittent, rapidly occuring incremental displacements for a plurality of movable code means. The invention has particular, but not exclusive, application to systems for the automatic remote reading of utility meters from a central station.

Utility meters, such as electric, gas and water meters, are generally widely distributed at the customers' points of usage. It is the present practice in the reading of such meters for a meter reader to visit each customer's site and to observe and record a registration on each unit. While there have been a large number of proposals for the automatic reading of such meters from a remote location, they have not been commercially adapted because of their high cost and because they could not meet the limitations imposed by existing utility meters and communication systems. Such limitations include the requirement that the encoding device utilized occupy a relatively small space in the utility metering equipment and impose a small mechanical load on the metering equipment. Another requirement is that the drive mechanism for the encoding device have a positive and precise action in response to the meter drive source. A further requirement is that the drive mechanism provide a sequence of spaced apart, rapid incremental displacements while being driven from a relatively slow continuously moving drive source.

SUMMARY OF THE INVENTION

It is an object of the invention to provide an economical and simple intermittent drive mechanism for an encoding device in which code members are advanced in rapid and precise incremental displacements and a minimal load is imposed on the drive source.

It is another object of the invention to provide an economical and simple intermittent drive mechanism for a movable member.

Another object of the invention is to provide a drive mechanism driven from a continuously moving source and producing an intermittent drive output.

Another object of the invention is to provide a drive mechanism for advancing a movable member in rapid incremental displacements and which has a positive and precise action.

Another object of the invention is to provide a drive mechanism for displacing a movable member and imposing a minimal load on its drive source.

A further object of the invention is to provide an encoding device occupying a minimal amount of space and having a drive mechanism in which a plurality of movable code means having a predetermined positional relationship are advanced in rapid and precise incremental displacements through a sequence of positions utilized to produce a binary code.

The objects of the invention are accomplished by providing a drive mechanism for an encoding device which has an input shaft continuously driven from a drive source such as a utility meter. The input shaft carries a first drive means for providing a rapid displacement movement. A gear wheel such as a first disc having a Geneva drive contour is engaged and driven by the drive means through a sequence of rapid displacements separated by dwell periods. The first disc drives a second drive shaft which in turn drives a second drive means similar to the first drive means. A second disc having a Geneva contour is freely mounted on the input drive shaft and is engaged and driven by the second drive means through a sequence of rapid displacements separated by dwell periods. Since the second disc is driven by rotation of the first disc, the second disc will be displaced once for each complete revolution of the first disc. A plurality of code units are positioned on each of the discs to provide means for producing coded information.

BRIEF DESCRIPTION OF THE DRAWINGS

FIG. 1 shows a remote meter reading system incorporating an encoding device according to the instant invention;
FIG. 2 shows a side view of the encoding device;
FIG. 3 is a sectional view taken along lines 3—3 of FIG. 2.

DESCRIPTION OF THE PREFERRED EMBODIMENT

Figure 5:
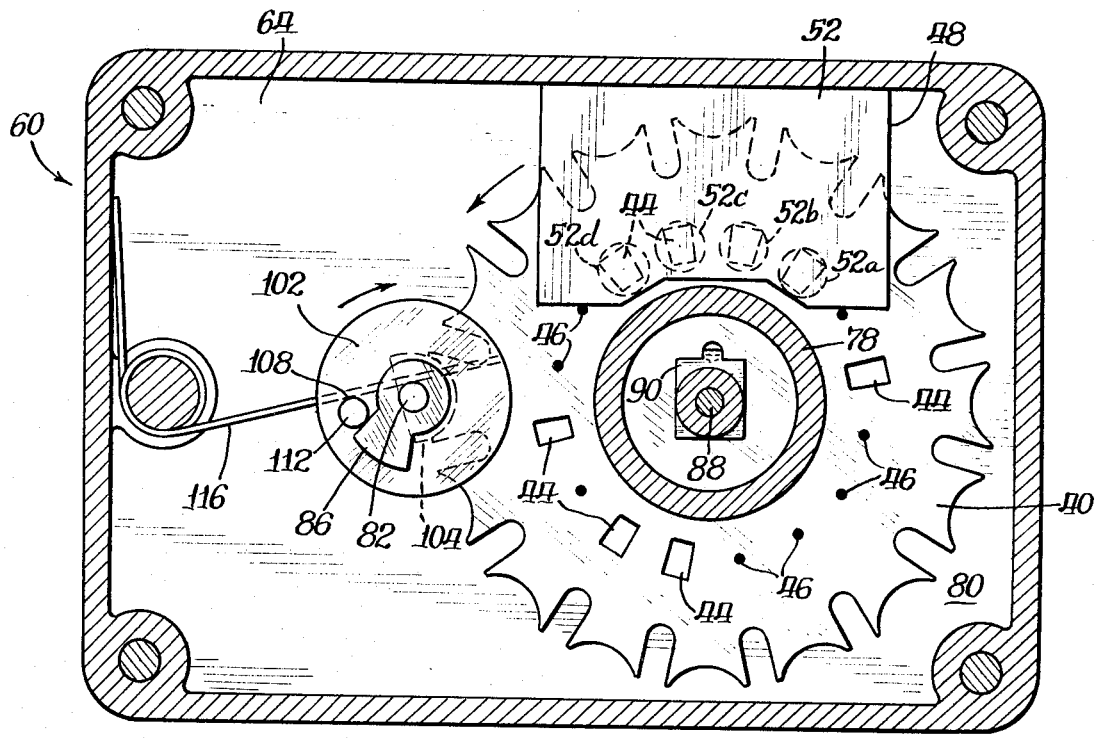
FIG. 5 shows a partial cross-sectional view taken along lines 5—5 of FIG. 3.
Figure 4:
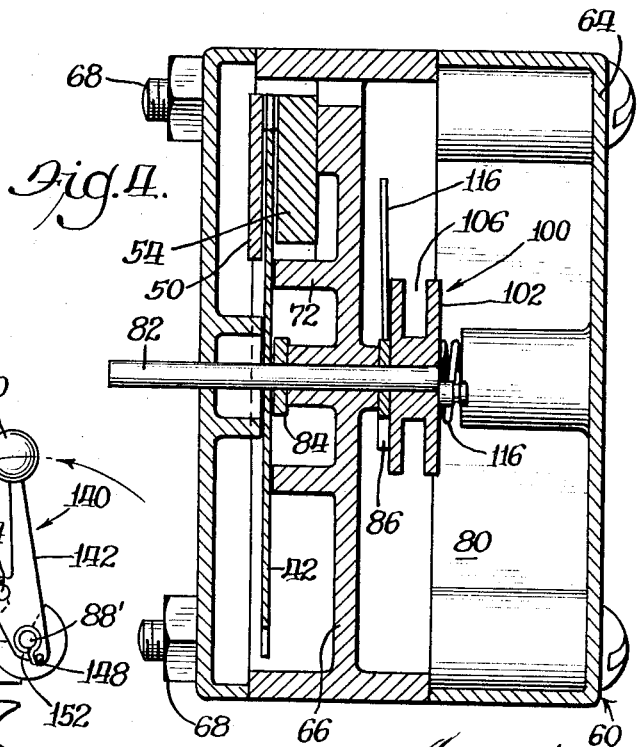
FIG. 4 is a sectional view taken along lines 4—4 of FIG. 2.

FIG. 1 shows an automatic remote meter reading system in which an encoding device 10 according to the instant invention is employed. The encoding device 10 is mechanically coupled to the meter 6 which is to be read and to the customers' telephone lines 12a and 12b through a transponder 8 and a line coupler 14. An interrogator 20 at the telephone exchange 4 is coupled to the lines 12a and 12b through a line selector 16 and a remote transponder exciter 18.

The details of the meter 6, the interrogator 20, the line selector 16 and the remote transponder exciter 18 form no part of the instant invention and, accordingly, will not be discussed in detail. It is sufficient for purposes of understanding the instant invention to note that, when it is desired to read the meter 6, the interrogator 20 is actuated and in turn actuates the line selector 16 and the remote transponder exciter 18. The remote transponder exciter 18 then sends a signal through the line 12a and 12b which actuates the line coupler 14, whereby the encoding device 10 and the transponder 8 are actuated and coupled to the lines 12a and 12b. The encoding device 10 provides the coded information relative to the registration of meter 6 to the transponder 8 which, in turn, transmits the information to the interrogator 20. The transponder 8 may include a rectifying circuit for providing a D.C. source for the encoding device 10.

The transponder 8 may also include one or more oscillators and the encoding device 10 may change the parameters of the oscillating circuit as a function of the meter registration, whereby different tone signals will be placed on the lines 12a and 12b in accordance with the reading of meter 6. The details of the transponder 8 form no part of the instant invention and therefore will be discussed hereinafter only to the extent necessary to describe the operation of the transponder 8 with the encoding device 10.

With reference to FIGS. 2–5, gear wheels are provided which may take the form of discs 40 and 42 each having a Geneva drive contour formed along their periphery. Each of the Geneva drive contours include 16 notches 74 separated by 16 concave portions 76. Each of the discs 40 and 42 is provided with an array of code units positioned along a circular path on the discs. In the illustrated embodiment, wherein each of the discs 40 and 42 has 16 positions corresponding to the 16 concave portions 76 and notches 74, 16 code units are provided on each disc and a different code unit is present at each position. A sensor assembly 48 is positioned opposite the disc 40 and a sensor assembly 50 is positioned opposite the disc 42. When the sensor assemblies 48 and 50 are photosensitive, the code units comprise holes or transparent positions 44 and unperforated opaque positions 46. Also, where the sensor assemblies 48 and 50 are photosensitive, a light emitting assembly 52 is positioned opposite the sensor assembly 48 on the opposite side of disc 40 from the sensor assembly 48 and a light emitting assembly 54 is positioned opposite the sensor assembly 50. The light emitting assembly 52 contains openings 52a, 52b, 52c and 52d which are positioned opposite the holes 44 or opaque positions 46 of the code units on disc 40. The light emitting assembly 54 includes openings 54a, 54b, 54c and 54d positioned opposite holes 44 or opaque position 46 of the code units in disc 42. Positioned in the openings 52a, 52b, 52c and 52d are light emitting diodes 53a, 53b, 53c and 53d. The light emitting diodes 55a, 55b, 55c and 55d are positioned in the openings 54a, 54b, 54c and 54d. Depending on the position of the respective discs 40 and 42 and therefore the particular code unit between a corresponding sensor assembly and light emitting assembly, light from the light emitting diodes will pass through an opening in a light emitting assembly and be blocked by an opaque position in a disc or be passed through a hole in a disc. The sensor assembly 48 includes sensors 48a, 48b, 48c and 48d, all of which may be photosensitive elements which normally have a relatively high impedance and which change to a low impedance state upon being illuminated. The elements 48–48d are each positioned opposite the position of a hole 44 or an opaque position 46, depending on the position of the disc 40. When light passes through a hole 44, one of the elements 48a–48d is illuminated so that its impedance changes to a low state. Similar photosensitive elements 50a, 50b, 50c and 50d may be positioned opposite holes 44 or opaque positions 46 in disc 42. When light from light emitting assembly 54 passes through a hole 44, one of the elements 50a–50c opposite a hole 44 will be illuminated so that its impedance is changed to a low state.

With reference to FIG. 1, the photoresistive elements 48a and 50a are connected in parallel and the parallel combination of 48a and 50a is connected in series with capacitor C1. The entire series-parallel circuit combination of elements 48a and 50a and capacitor C1 is connected to transponder 8. The photoresistive elements 48b and 50b and capacitor C2 are connected in a similar series-parallel circuit combination and the combination is also connected to transponder 8. Photoresistive elements 48c and 50c and capacitor C3 are connected in a similar series-parallel circuit which in turn is coupled to transponder 8. Photoresistive elements 48d and 50d and capacitor C4 are connected in a similar series-parallel circuit which is also coupled to transponder 8.

The light emitting diodes 53a, 53b, 53c and 53d are connected in series and the light emitting diodes 55a, 55b, 55c and 55d are connected in series. The two groups of series connected light emitting diodes have a common terminal connected by conductor 56 to one side of the rectifying bridge (not shown) within transponder 8. The light emitting diodes 55a–55 also have a terminal connected through resistor R1 to the other side of the rectifying bridge within transponder 8. The light emitting diodes 53a–53d have a terminal connected to the other side of the rectifying bridge within the transponder 8 through an RC time delay circuit 58. The latter circuit includes resistors R2 and R3 and a capacitor C5. In addition, resistor R4 and photocell PC1 are respectively connected to opposite ends of the resistor R3 and in common to a terminal of the series connected light emitting diodes 53a–53d When it is desired to obtain a reading of the meter 6, the interrogator 20 is actuated and this, in turn, actuates the remote transmitter exciter 18 and the line selector 16 which selects the particular customer lines 12a and 12b. The remote transmitter exciter 18 places a positive potential signal on the line 12a and a negative potential signal on line 12b. The line coupler 14 becomes operative in response to the potential signal on lines 12a and 12b to electrically couple the transponder 8 and encoding device 10 to lines 12a and 12b. When the line coupler 14 initially becomes active, a voltage is applied to time delay circuit 58 which momentarily prevents light emitting assembly 52 from being energized. The initial polarity of the potential signal on lines 12a and 12b is such that light emitting assembly 54 will not be energized. During the time delay provided by time delay circuit 58, a reference tone from transponder 8 will be applied to the lines 12a and 12b and received by the interrogator 20. At the end of the time delay, the light emitting diodes 53a–53d will be energized and those ones of photocells 48–48d opposite a hole 44 will drop to their low impedance condition. Lowering of the impedance of any one of the photocells 48a–48d effectively places the one of the capacitors C1–C4 connected in series with the low impedance photocell in circuit with the transponder 8 such that the tone of the transponder 8 is modified to indicate the position of the disc 40. For a more detailed description of the operation of transponder 8 and line coupler 14, reference is made to co-pending application, Ser. No. 285 filed Jan. 2, 1970, by Victor E. Stewart Jr., and assigned to the assignee of the instant invention.

With reference to FIGS. 2–5, the encoding device 10 includes a drive mechanism 80 and a support 60. The support 60 includes a cover 62, a cover 64 and a wall 66 disposed between the covers 62 and 64. The disc 40 is positioned between the wall 66 and the cover 64 and the disc 42 is positioned between the wall 66 and the cover 62. The periphery of each of the discs is provided with a Geneva drive contour having teeth in the form of notches 74 and concave portions 76. As may be seen in FIG. 3, the axis of the discs 40 and 42 are spaced apart and planes aligned with the side faces of the discs form a space within which the wall 66 is positioned. Also disposed within this space and mounted on the wall 66 are the light emitting assemblies 52 and 54. The sensor assemblies 48 and 50 are mounted on the wall 66 outside of the space and opposite the light emitting assemblies 52 and 54, respectively. Thus, rotation of the discs 40 and 42 moves the holes 44 and opaque positions 46 along a path between the light emitting diodes and corresponding photoresistive elements. The covers 62 and 64 are secured to the wall 66 by means such as screws and nuts 68.

An input drive shaft 82 extends through the cover 62 and the wall 66 and is held in axial position relative to the wall 66 by collar 84 and drive pawl 86. The input drive shaft 82 is connected for rotation to a drive source such as meter 6. The disc 42 is freely mounted on shaft 82 and is rotatable independently of shaft 82. Ring-shaped projections 70 and 72 respectively extend from cover 62 and wall 66 against the opposite sides of disc 42 to maintain disc 42 in the desired axial position relative to shaft 82. It may readily be appreciated that projections 70 and 72 formed as an integral part of the cover 62 and wall 66, respectively, provide a simple and economical way of positioning the disc 42 axially on the shaft 82. A drive shaft 88 also extends through the wall 66 and is maintained in an axial position relative to the wall 66 by crank member 90 (see FIG. 5) and drive pawl 92 (see FIG. 3). The disc 40 is provided with teeth along its periphery in the form of a Geneva drive contour. The disc 40 is freely mounted on shaft 88, however, the crank member 90 is rigidly affixed to the shaft 88 and has a projecting portion which extends through disc 40 so that disc 40 and shaft 88 rotate together. This arrangement permits some axial movement by disc 40 to allow it to adjust to inaccuracies in the manufacture of the wall 66 while at the same time permitting rotational driving of the shaft 88 by the disc 40. A collar 94 and a ring-shaped projection 78 extending from wall 66 provide limits within which the disc 40 may axially move.

The drive mechanism 80 includes the drive assembly 100 freely mounted on the input drive shaft 82 and the drive assembly 120 freely mounted on the drive shaft 88. The drive assembly 100 includes a spool 102 having a holding segment 104 and a slot 106. A drive pin 108 extends through the spool 102 at a position radially opposite from the holding segment 104. The drive pin 108 has an end 110 extending from one side of the spool 102 and an end 112 extending from the other side of the spool 102. A spring 116 is mounted on the wall 66 and engages a groove 114 in the end 110 of drive pin 102. The drive assembly 100 and disc 40 are positioned such that the edge of the disc 40 having the Geneva contour is within the slot 106. Relative to the view shown in FIG. 5, the drive assembly 100 is rotatable so that the pin 108 moves along a path including a path portion in a downward direction along the circumference of the disc 40 in engagement with one of the notches 74 and along a path portion out of engagement with notches 74 in an upward direction. As the pin 108 moves downwardly along its path in engagement with a notch 74, the holding segment 104 will be out of engagement with the disc 40 and the disc 40 will be advanced in a counter-clockwise direction. When the pin 108 moves out of engagement with a notch 74 and into the second portion of its path, the holding segment 104 moves into engagement with a concave portion 76 of the disc 40 to hold the disc 40 stationary while the pin 108 moves along the second path portion.

The drive pawl 86 is tightly affixed to shaft 82 and may be driven continuously in a clockwise direction. During upward movement of pawl 86 as viewed in FIG. 5, the pawl 86 engages the end 112 of pin 108 and moves the pin 108 upwardly to a position where it may move into engagement with a notch 74. Since the spring 116 engages the end 110 of the pin 108 on its upper side as viewed in FIG. 5, upward movement of the pawl 86 also moves the spring 116 to a stored energy or biased condition. Because the spool 102 is freely mounted on the shaft 102, when the pin 108 moves just past the most upward position in its path of movement, the spring 116 will move to its energy discharged or unbiased condition and thereby rapidly move the pin 108 along its path in engagement with a notch 74 to rapidly advance the disc 40. The drive pawl 86 does not rotate at the rapid advancing rate of the drive pin 108 so that the pin 108 will remain stationary at the end of its downward motion. When the drive pawl 86 catches up with the pin 108, the pin 108 will again be driven upwardly and the spring 116 moved to a higher energy level in preparation for another rapid advancing movement of the disc 40.

It may thus be readily appreciated that the drive assembly 100 together with the shaft 82 and drive pawl 86 are effective to advance the disc 40 through a sequence of alternating precise, rapid indexing steps and motionless dwells. Because there are 16 notches in the Geneva contour of the disc 40, 16 rapid indexing movements will provide one complete revolution of the disc 40. Between each indexing movement, the disc 40 will be in one of 16 possible positions each having a code unit provided with a different combination of holes 44 and opaque positions 46.

The drive assembly 120 includes a spool 122 freely mounted on shaft 88 and having a holding segment 124 and a slot 126. A drive pin 128 extends through the spool 122 and has an end 130 and an end 132. A spring 118 is mounted on the wall 66 and engages the end 132 of the pin 128 in a groove 134. The operation of the drive assembly 120, drive pawl 92 and spring 118 to alternatively rapidly advance and hold stationary disc 42 is similar to the operation of the drive assembly 100, drive pawl 86, and spring 116, in advancing disc 40 and therefore will only be briefly summarized. As viewed in FIG. 2, the drive assembly 120 is movable in a counterclockwise direction in which the drive pin 128 moves along a path including a first path portion in a downward direction in engagement with a notch 74 in disc 42. The pin 128 is driven relatively upwardly along a second path portion by the drive pawl 92 to position the pin 128 for a disc advancing motion and move the spring 118 to a stored energy or biased condition. As the drive pin 128 is moved just past its most upward position, it becomes free together with spool 122 to be rapidly advanced in engagement with disc 42 as spring 118 moves to a low energy level or unbiased condition. Because drive pawl 92 moves at a slower rate than the advancing rate provided by spring 118, the disc 42 will remain stationary until drive pawl 92 catches up with pin 128 to rotate the spool 122 counterclockwise and move the pin 128 upward in preparation for another disc advancing movement. Holding segment 124 engages a concave portion 76 of disc 42 to hold disc 42 motionless while the drive pin 128 is being moved along the upward portion of its path. The drive pawl 92 is tightly affixed to the drive shaft 88 and, as previously stated, drive shaft 88 is rotated by disc 40. It may thus be seen that drive pawl 92 rotates only when disc 40 is indexed and that pin 128 will make only one revolution for each revolution of disc 40. Thus disc 42 will be indexed only once for each complete revolution or 16 indexing movements of disc 40. Thus, a total of 256 disc steps providing 256 code positions is available from the encoding device 10 to indicate the reading of the meter 6.

Because the disc 42 is freely mounted on the input drive shaft 82 which drives the drive assembly 100 and disc 40, and the drive assembly 120 is driven by the disc 40, a "folded" disc and drive arrangement best shown in FIG. 3 may be utilized. This arrangement contributes significantly to the compactness required for an encoder in an automatic meter reading system. Since some clearance space between disc 42 and drive assembly 100 and between disc 40 and drive assembly 120 is required, the space may be utilized for coding means of the encoding device 10 which cooperate with the discs 40 and 42. In the disclosed embodiments, the light emitting assemblies 52 and 54 have been positioned within this space. The sensor assemblies 48 and 50 could, of course, be positioned within the space and the light emitting assemblies 52 and 54 be positioned to the outside of the discs 40 and 42.

It will be appreciated that the drive mechanism 80 operates continuously while the meter 6 is responsive to the quantity being measured. Thus, while the transponder 8 and encoding device 10 are operative, the discs 40 and 42 will be in one of their positions indicative of the meter reading and the tone produced by the transponder 8 will in turn be indicative of the positions of the discs 40 and 42.

Figure 6:
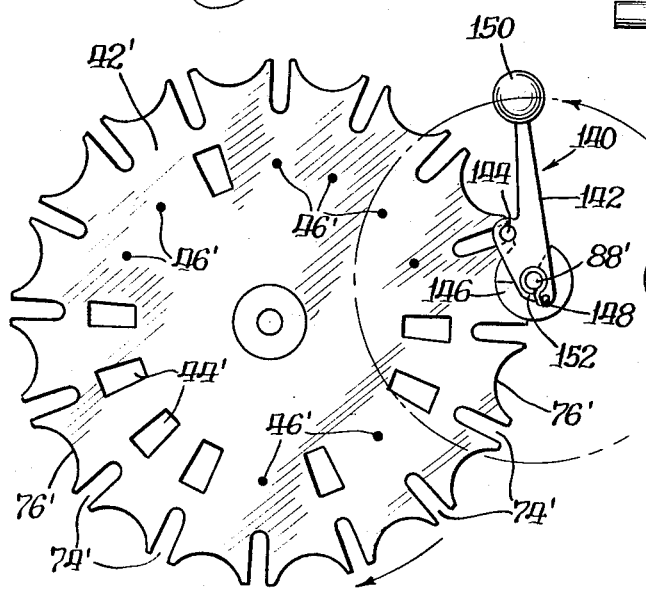
FIG. 6 shows an alternate embodiment of the drive mechanism of the encoding device.

In FIG. 6, another embodiment of the invention is illustrated in which the advancing spring is replaced with a weight member for rapidly indexing the Geneva drive disc. In FIG. 6, those parts of the drive mechanism identical to the parts of the drive mechanism shown in FIGS. 1–5 are identified by the same number with the addition of a prime (') mark. Only those parts of the drive mechanism not shown in FIGS. 1–5 are identified by a new number. The disc 42' is freely mounted on the input drive shaft 82' and carries holes and opaque positions 46' positioned in a circular array. The periphery of the disc 42' is provided with a Geneva drive contour having a 16 notches 74' separated by 16 concave portions 76'. A drive assembly 140 is freely mounted on the drive shaft 88' and includes a drive arm 142, a drive pin 144, a holding segment 146, a projection 148 and a weight 150. A drive collar 152 is tightly affixed to the drive shaft 88' and extends away from the shaft 88' for engagement with the projection 148.

The operation of the drive assembly 140 is similar to the drive assemblies 100 and 120 with the exception that the weight 150 provides the biasing force rather than springs 116 and 118. Also, because gravitational energy is the source of force for advancing the disc 42', the drive assembly 140 and disc 42' must be oriented such that the direction of movement of the weight 150 is upwardly and downwardly. The drive pin 144 is thus movable along a path which includes a portion in engagement with the disc 42' in a downward direction and a portion out of engagement with the disc 42' in an upward direction. While the pin 140 is moving in an upward direction, the holding segment 146 engages a concave portion 176' to hold the disc 42' stationary. The drive pin 144 and weight 150 are moved in an upward direction by the drive collar 152 as it rotates with drive shaft 88' and engages the projection 148. This moves the pin 144 close to engagement with a notch 76' and raises the weight 150 to a high energy level condition. As the pin 144 moves just past its highest position, the drive assembly 140 will be free of the drive collar 152 and the drive pin 144 will move rapidly downward in engagement with a notch 76' under the force of weight 150 as it moves from its high energy level condition to a low energy level condition. At the end of this rapid advancing movement of disc 42', the holding segment 146 will again engage a concave portion 76' to hold the disc 42' stationary. The drive collar 152 and drive shaft 88' move considerably slower than the drive assembly 140 under the biasing force of weight 150 so that the drive assembly 140 will remain in a downward position until the drive collar 152 catches up with the projection 148. When the projection 148 is again engaged by the drive collar 152, the drive assembly 140 will again move up to its high energy level condition to provide another rapid advancement of the disc 42'. It will thus be appreciated that the disc 42' will be advanced through a sequence of rapid indexing movements each separated by a motionless dwell period. It should also be understood that both the drive assemblies of the drive mechanism 80 may be of the type shown in FIG. 6.

It will be appreciated that the drive mechanism 80 of the encoding device 10 places a minimal load on the meter 6 inasmuch as the resilient means or weights which provide the advancing force for the encoding discs are gradually raised to a high energy level condition during the upward movements of the drive pawls 86 and 92 or the drive collar 152. Also, any binding which may occur when the drive pins move into engagement with the notches in the discs and advance the discs does not place a load on the drive source since the drive pins rotate free of the drive shafts during indexing movement of the discs. Use of a Geneva drive contour on the encoding discs readily provides positive and precise positioning which is of critical importance in an encoding device having movable encoding members. The load on the drive source is further minimized by utilizing a support for the drive mechanism which has a low coefficient of static and dynamic friction. This permits minimum friction between the support and the drive shafts and the disc and ring-shaped projections maintaining the discs axially in place.

While only two specific embodiments of the invention have been shown herein, it will be realized that many modifications thereof are feasible without departing from the spirit and scope of the invention. It is accordingly intended that the scope of the invention is not to be limited by the specific embodiments disclosed.

I claim:

1. In an encoding device, the combination of first drive means including a first rotatable gear wheel having a first plurality of code units arranged thereon and having gear teeth formed therein in the shape of a Geneva drive contour, said first drive means also including a drive member engaging the teeth of said first gear wheel and rotatably driving the latter, second drive means rotatable with said first gear wheel, and driven means including a second gear wheel having a second plurality of code units arranged thereon and having gear teeth formed therein in the shape of a Geneva drive contour, said second drive means engaging the teeth of said second gear wheel and driving the second gear wheel.

2. In an encoding device, the combination of first drive means including a drive shaft and a first rotatable gear wheel having a first plurality of code units arranged thereon, second drive means rotatable with said first gear wheel, and driven including a second gear wheel freely mounted on said drive shaft and having teeth formed therein and a second plurality of code units arranged thereon, said second drive means engaging said teeth driving the second gear wheel.

3. In a drive mechanism, the combination comprising, first drive means including a first rotatable drive shaft, a first gear wheel rotatable through a plurality of distinct positions by said first drive means, second drive means coupled to and rotatable with said first gear wheel, a second gear wheel rotatable by said second drive means through a plurality of distinct positions and being freely mounted on said drive shaft, first code means having a first plurality of code units on said first gear wheel, one of said code units being provided for each position of the first gear wheel, second code means positioned opposite said first gear wheel for operative association with said first plurality of code units, third code means comprising a second plurality of code units on said second gear wheel, one of said second plurality of code units being provided for each position of the second gear wheel, and fourth code means positioned opposite said second gear wheel for operative association with second plurality of code units.

4. The combination according to claim 3 wherein said first and second gear wheels each have a Geneva drive gear contour, said first drive means including a first drive member engaging the gear contour of said first gear wheel and rotating the latter to each of its distinct positions, said second drive means including a second drive member engaging the gear contour of the second gear wheel and rotating the latter to each of its distinct positions.

5. The combination according to claim 3 wherein each of said gear wheels has a side, and further comprising a space defined by two planes each aligned with a different one of said sides, said sides facing toward said space, and said second and fourth code means being positioned in said space.

6. The combination according to claim 5 further comprising support means including a first wall positioned in said space and separating said second and fourth code means, a second wall, said second gear wheel has opposed sides and is positioned between said first and second walls, said walls supporting said drive shaft, and each of said walls has a projection extending into engagement with one of the sides of the second gear wheel whereby the second gear wheel is maintained at a predetermined axial position on said shaft.

7. In an encoding device, the combination comprising a gear wheel having a plurality of code units arranged thereon and being rotatable in a predetermined circumferential direction, code means responsive to the position of said plurality of code units to indicate the position of said gear wheel, drive means movable along a path including a first portion in engagement with and substantially along the circumference of the gear wheel to rotate the gear wheel in said predetermined direction, actuating means engaging said drive means and being movable between a high energy level condition and a low energy level condition, said actuating means being effective while moving from said high energy level condition to said low energy level condition to rapidly advance the drive means along the first portion of said path whereby said gear wheel is rapidly rotated, said drive means being movable along a second portion of said path in a direction opposite to said predetermined direction to return the actuating means from said low energy level condition to said high energy level condition.

8. The combination according to claim 7 wherein said gear wheel is stationary while the drive means moves along the second portion of said path and said drive means includes a holding segment engaging and maintaining said gear wheel stationary during movement of the drive means along said second portion of said path.

9. The combination according to claim 8 wherein said gear wheel has a Geneva drive contour comprising a series of alternating notches and concave portions, said drive means engaging one of said notches during rotation of the gear wheel and said holding segment engaging one of said concave portions while said gear wheel is stationary.

10. The combination according to claim 7 wherein said actuating means comprises resilient means and said gear wheel is in a biased condition in response to said resilient means during movement of the drive means along the first portion of said path and in an unbiased condition during movement of the drive means along the second portion of said path.

11. The combination according to claim 7 wherein said actuating means comprises weight means and said gear wheel is in a biased condition in response to said resilient means during movement of the drive means along the first portion of said path and in an unbiased condition during movement of the drive means along the second portion of said path.

12. The combination according to claim 7 wherein said drive means includes a rotatable shaft, a first lever member rigidly affixed to said shaft, a second lever member freely mounted for rotation on said shaft, said second lever member being in engagement with and rotated by the actuating means in said predetermined direction, said second lever member being in engagement with and rotated by the first lever member in said opposite direction.

13. The combination according to claim 12 wherein said actuating means comprises resilient means held by the second lever while the latter is rotated in said opposite direction whereby the resilient means is placed in said high energy level condition.

14. In an encoding device having code means, the combination comprising, a drive shaft, a support having two opposed sides supporting said drive shaft and a gear wheel having a plurality of code units arranged thereon for cooperation with said code means, said gear wheel also having two opposed sides and being freely mounted on said shaft between said opposed support sides, each of said support sides having a projection including an elongated surface in engagement with a side of the gear wheel whereby said gear wheel is maintained at a predetermined axial position on said shaft.

15. In an encoding device having code means and a drive mechanism, the combination comprising, a support, a shaft rotatably mounted on said support, drive means for rotating said shaft including a gear wheel having a first plurality of code units arranged thereon for cooperation with said code means, said gear wheel being mounted on said shaft in axially movable relationship to the shaft, and a crank member connecting said gear wheel and shaft, said crank member holding said gear wheel in a circumferentially fixed relationship to said shaft.

* * * * *